United States Patent
Buerger et al.

(10) Patent No.: US 11,255,055 B2
(45) Date of Patent: Feb. 22, 2022

(54) METHOD AND SYSTEM FOR MAINTENANCE OF A PERMANENT WAY FOR RAIL VEHICLES

(71) Applicant: PLASSER & THEURER EXPORT VON BAHNBAUMASCHINEN GESELLSCHAFT M.B.H., Vienna (AT)

(72) Inventors: Martin Buerger, Linz (AT); Gerald Zauner, Wilhering (AT)

(73) Assignee: Plasser & Theurer Export von Bahnbaumschinen Gesellschaft, Vienna (AT)

( * ) Notice: Subject to any disclaimer, the term of this patent is extended or adjusted under 35 U.S.C. 154(b) by 622 days.

(21) Appl. No.: 16/306,044

(22) PCT Filed: May 17, 2017

(86) PCT No.: PCT/EP2017/000598
§ 371 (c)(1),
(2) Date: Nov. 30, 2018

(87) PCT Pub. No.: WO2017/215777
PCT Pub. Date: Dec. 21, 2017

(65) Prior Publication Data
US 2019/0136462 A1   May 9, 2019

(30) Foreign Application Priority Data

Jun. 13, 2016 (AT) .................................. A 287/2016

(51) Int. Cl.
*E01B 35/12* (2006.01)
*B61L 25/02* (2006.01)
(Continued)

(52) U.S. Cl.
CPC ................ *E01B 35/12* (2013.01); *B61K 9/08* (2013.01); *B61L 15/0081* (2013.01);
(Continued)

(58) Field of Classification Search
CPC ....... G01C 21/005; B61L 3/002; B61L 3/004; B61L 15/0081; B61L 23/04;
(Continued)

(56) References Cited

U.S. PATENT DOCUMENTS 4,986,189 A * 1/1991 Theurer .................. E01B 27/17
104/12
5,893,043 A * 4/1999 Moehlenbrink ...... B61L 25/021
701/446
(Continued)

FOREIGN PATENT DOCUMENTS

CN  103171594 A  6/2013
CN  103635375 A  3/2014
(Continued)

*Primary Examiner* — Jason C Smith
(74) *Attorney, Agent, or Firm* — Laurence A. Greenberg; Werner H. Stemer; Ralph E. Locher (57) ABSTRACT

A method for maintenance of a permanent way, roadway or travel path for rail vehicles includes determining the actual condition of the permanent way by using a measuring system to record measurement data. Objects along the permanent way are detected from the measurement data by using an evaluation device. A detected object is assigned to an object class, and at least one object class identification linked with positional data is stored in a database for a detected object. The actual condition of the permanent way is thus stored in an object-based manner, and a comparison with a target condition or with historic actual conditions is used for the planning and execution of maintenance measures. A maintenance system for executing the method is also provided.

12 Claims, 4 Drawing Sheets

(51) Int. Cl.
  *B61L 27/00* (2006.01)
  *B61K 9/08* (2006.01)
  *B61L 23/04* (2006.01)
  *B61L 15/00* (2006.01)
  *E01B 35/00* (2006.01)
  *G06K 9/00* (2006.01)
  *G01C 21/00* (2006.01)
  *G06F 16/29* (2019.01)
  *B61L 3/00* (2006.01)

(52) U.S. Cl.
  CPC ............ *B61L 23/042* (2013.01); *B61L 25/02* (2013.01); *B61L 27/0094* (2013.01); *E01B 35/00* (2013.01); *G01C 21/005* (2013.01); *G06F 16/29* (2019.01); *G06K 9/00624* (2013.01); *B61L 3/002* (2013.01); *B61L 3/004* (2013.01)

(58) Field of Classification Search
  CPC .... B61L 23/042; B61L 25/02; B61L 27/0094; G06K 9/00624; G06K 9/00791
  See application file for complete search history.

(56) References Cited

U.S. PATENT DOCUMENTS

| | | | | |
|---|---|---|---|---|
| 5,956,664 | A * | 9/1999 | Bryan | B61L 23/048 702/184 |
| 8,514,387 | B2 * | 8/2013 | Scherf | B61K 9/08 356/237.1 |
| 2003/0222981 | A1 * | 12/2003 | Kisak | B61L 15/0027 348/148 |
| 2012/0300060 | A1 * | 11/2012 | Farritor | B61L 23/047 348/125 |
| 2016/0341554 | A1 * | 11/2016 | Hillier | G08G 5/0013 |
| 2019/0136462 | A1 * | 5/2019 | Buerger | B61L 23/042 |

FOREIGN PATENT DOCUMENTS

| | | |
|---|---|---|
| CN | 104494650 A | 4/2015 |
| CN | 204605855 U | 9/2015 |
| DE | 19532104 C1 | 1/1997 |
| DE | 19801311 A1 | 5/1999 |
| DE | 102011017134 A1 | 10/2012 |
| DE | 102014201238 A1 | 7/2015 |
| EP | 2784540 A1 | 10/2014 |
| EP | 2937241 A1 | 10/2015 |

* cited by examiner

METHOD AND SYSTEM FOR MAINTENANCE OF A PERMANENT WAY FOR RAIL VEHICLES

BACKGROUND OF THE INVENTION

Field of the Invention

The invention relates to a method for maintenance of a permanent way for rail vehicles, wherein, for determining an actual condition of the permanent way, measurement data are recorded by means of a measuring system. The invention further relates to a maintenance system for execution of the method.

Description of the Related Art

A permanent way for rail vehicles encompasses not only tracks, switches and crossings, but also catenaries and switch connections as well as other lineside equipment. In this, a track consists of rails fastened on sleepers and, as a rule, is supported in a ballast bed.

Due to use and weather effects, such a permanent way is subject to continuous wear, as a result of which regular maintenance measures are necessary. Basis for this are actual data of the permanent way which are detected by means of various known measuring methods and measuring devices.

From U.S. Pat. No. 4,986,189 A, for example, a measuring beam mounted on a track maintenance machine is known which comprises several sensors, wherein the measurement data recorded by the same are evaluated together. An extensive acquisition of measurement data for maintenance procedures is also known from DE 198 01 311 A1. In this, storage of image data or numerical data with regard to a line position is provided.

DE 10 2011 017 134 A discloses an arrangement for marking and surveying track sections for the purpose of maintenance. By means of a sensor unit, measuring points located next to a rail are recorded in a contact-free manner in order to determine the exact position of track sections prone to wear.

SUMMARY OF THE INVENTION

It is the object of the invention to indicate an improvement over the prior art for a method and a maintenance system of the type mentioned at the beginning. In particular, efficient planning and execution of maintenance procedures is to be accomplished.

According to the invention, this object is achieved by way of a method for maintenance of a permanent way for rail vehicles wherein, for determining an actual condition of the permanent way, measurement data are recorded by a measuring system, objects of the permanent way are detected from the measurement data by an evaluation device, a detected object is assigned to an object class, and an object class identification linked to positional data is stored for an assigned object in a database. The invention also relates to a maintenance system for executing a method according to the invention, comprising a measuring system for recording measurement data, installed on a rail vehicle. The evaluation device is configured for detecting objects of the permanent way from the measurement data and for assigning the particular object to an object class, and a data transmission system is set up for transmitting the data assigned to an object to the database. Dependent claims indicate advantageous embodiments of the invention.

In this, objects of the permanent way are detected from the measurement data by means of an evaluation device, wherein a detected object is assigned to an object class, and wherein an object class identification linked to positional data is stored for an assigned object in a database.

Measurement data recorded by means of known measuring methods are evaluated in a novel manner in that individual objects of the permanent way are identified and assigned to prescribed object classes. Objects such as rail sections, sleepers, switches, masts etc. are recognized on the basis of their characteristic measurement data. Storage takes place by assignment to the corresponding object class, wherein a link to relative and/or absolute position data is made.

The actual condition of the permanent way is thus stored in an object-based manner, wherein a comparison to a desired condition or to historic actual conditions is used for the planning and execution of maintenance measures.

An advantageous object detection by means of an evaluation device provides that the measurement data are compared with preset object parameters. Object parameters can be, for example, dimension ranges of defined geometric shapes or detectable material characteristics. The assignment to the particular object class then also takes place on the basis of these object parameters.

In this, it is useful if a unique object identification for the respective object is stored in the database. A damage to be repaired can thus be allocated in a particularly simple manner in that a defective object (for instance, a rail section with surface faults, sleeper with position fault, etc.) is correspondingly marked on the basis of the object identification in the database.

For exact processing of linked position data, it is advantageous if location-related synchronisation data are derived from the measurement data, and if associated synchronisation data are stored in the database for the particular object. On the basis of the synchronisation data (for example, gauge width, sleeper batch number, etc.) the individual objects can be found almost in a pinpoint way by a track-bound maintenance machine. To that end, the maintenance machine need only be equipped with the sensors which were employed during a previous determination of the actual condition of the permanent way.

A further development of the invention provides that a multi-dimensional model of the permanent way is computed from the measurement data and from characteristic data of the measuring system. Such a digital multi-dimensional model is either stored in the database or fed to a separate data management. It allows particularly efficient planning and execution of maintenance measures (for instance, virtual track inspection, computation of material quantities, etc.).

In this, it is advantageous if the multi-dimensional model is supplemented with data of a virtual clearance gauge. In this manner, it is possible to calculate by means of a computer system whether actual position data of a particular object exceed a limit of the clearance gauge. Each violation of the clearance gauge is thus unambiguously surveyed and identified. If necessary, other detected features of the track, such as sleeper embossings, rail milling marks, rail spacings, distances to adjacent tracks, catenary positions, rail defects etc., are also supplemented in the multi-demensional model and are thus unambiguously surveyed and identified.

A further useful extension provides that the multi-dimensional model is supplemented with geo-referenced information data of a separate data source. Thus, the multi-dimensional model can be augmented in a simple manner with geodetic data and satellite images.

In a further development of the invention, control data for a work sequence of a rail-bound construction- and/or maintenance machine are derived from the data stored in the database. Thus, all the required stipulations for a maintenance unit (for example, a tamping unit or lifting-lining unit of a track tamping machine) are already supplied in advance. The construction- and/or maintenance machine can thus be employed for automatic operation. Favourably, the correction data of the permanent way are predefined from a central point (off track) on the basis of the data stored in the database. From this, the particular action- and parameter data for the individual units are computed in the construction- and/or maintenance machine (on track).

In this, it is advantageous if a target condition of the permanent way is specified, if deviations of the actual condition from the target condition are evaluated, and if the control data are prescribed in dependence on the evaluated deviations. Then, a preparation for the automated operation of the construction- and/or maintenance machine includes the pre-setting of correction data in order to transfer objects of the permanent way from a faulty actual state into the desired target condition.

An additional improvement of the maintenance method provides that, after a work sequence of the construction- and/or maintenance machine, the actual condition of the permanent way is determined. With this, it is possible to determine and document the quality achieved immediately after execution of a maintenance measure. Also useful is a protocolling of the complete machine conditions during a maintenance procedure. These data can subsequently be evaluated in order to determine their relevance with regard to the quality and to establish connections between unit actions or unit parameters and results.

A maintenance system, according to the invention, for executing one of the afore-mentioned methods comprises a measuring system for recording measurement data, installed on a rail vehicle. In this, the evaluation device is configured for detecting objects of the permanent way from the measurement data and for assigning the particular object to an object class, wherein a data transmission system is set up for transmitting to a database the data assigned to an object. The evaluation device is favourably designed as a computer with access to the database set up in a server, or with an integrated database. In the latter case, the computer comprises a data transmission system designed as a bus system.

In a further development, it is provided that the evaluation device is set up for computing a multi-dimensional model of the permanent way from the measurement data and from characteristic data of the measuring system. To that end, coordinates of the permanent way surface which can be derived from the measurement data are transformed into a prescribed three-dimensional reference system. To the spatial dimensions, additional dimensions such as the time, temperature or individual material characteristics can be added.

For efficient operation of the maintenance system, it is advantageous if the maintenance system includes an output device for perspective representation of the multi-dimensional model. Such output devices enable a virtual track inspection and intuitive definition of correction data, for example. In this, individual object classes, material characteristics or recognized faults can be indicated by colours.

For generating detailed object data, it is provided that the measuring system comprises a laser rotation scanner, a laser line scanner, an eddy current scanner, an inertial measuring unit, a camera and a GNSS receiver. By data fusion of the measurement data detected by means of these sensors, a model of the permanent way with high information density can be compiled.

A further development of the invention relates to further processing of the data stored in the database, in that the maintenance system comprises a rail-bound construction- and/or maintenance machine which is configured for processing control data derived from data stored in the database.

BRIEF DESCRIPTION OF THE DRAWINGS

The invention will be described by way of example below with reference to the attached figures. There is shown in schematic representation in:

FIG. 1 partial components of the maintenance system
FIG. 2 sequence of the maintenance method
FIG. 3 data processing of the measuring system
FIG. 4 analysis of the measurement data
FIG. 5 structure of an analysis software
FIG. 6 structure of a machine control software
FIG. 7 structure of a track maintenance software
FIG. 8 work sequence of a construction- and/or maintenance machine

DESCRIPTION OF THE INVENTION

Figure 1:
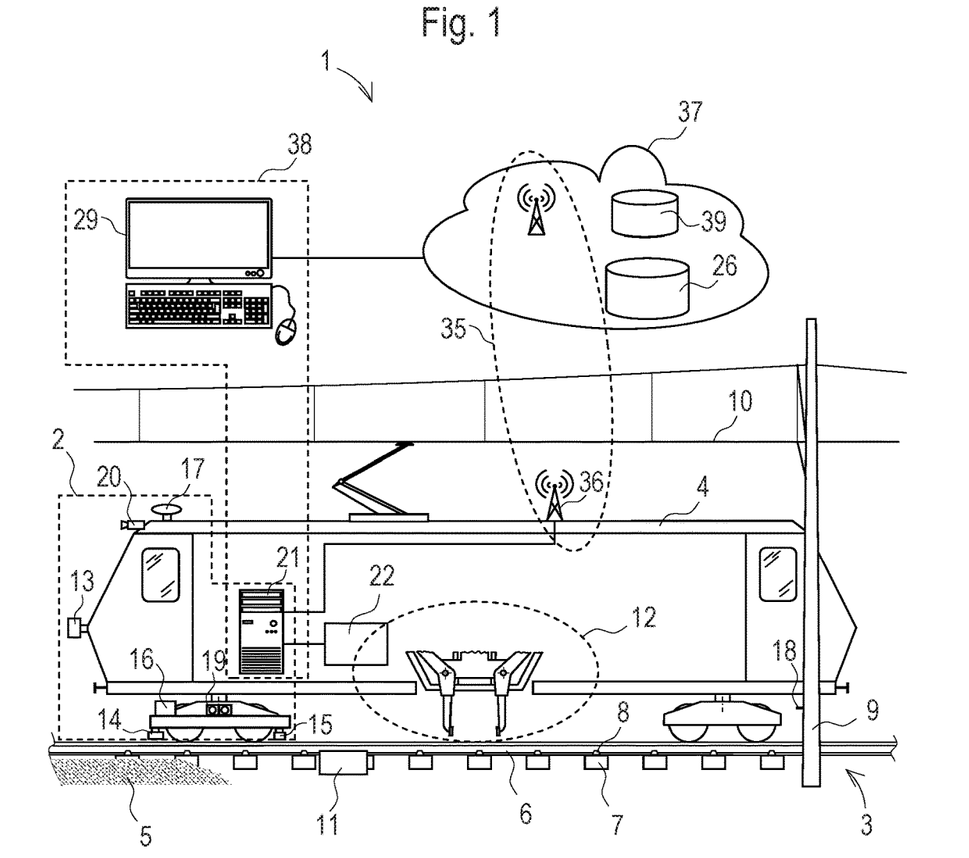

The maintenance system 1 in FIG. 1 comprises a measuring system 2 for surveying the permanent way 3. Favourably, this measuring system 2 is arranged on a rail-bound construction- and/or maintenance machine 4. Alternatively, the measuring system 2 can also be installed on another carrier platform, for example on a measuring car.

The permanent way 3 comprises different objects such as ballast 5, rails or rail sections 6, sleepers 7, fastening means 8, masts 9, contact wires or contact wire sections 10, and installations which are to be regarded as obstacles 11 for working units 12. Also attributed to the permanent way 3 or the extended permanent way 3 are objects not shown, such as platforms, switch elements, vegetation, noise protection walls, railings, traffic signs, signal installations, control mechanisms, or constraints such as bridges or level crossings.

The measuring system 2 encompasses several sensors which may be attached at different positions. For example, a laser rotation scanner 13 is arranged at the front side of the construction- and/or maintenance machine 4. The laser rotation scanner 13 delivers two-dimensional images of the permanent way 3 at the current position. These image data are processed together with the position data gained by means of GNSS or odometer. Several two-dimensional images in a row result in a three-dimensional point cloud. This point cloud is filtered and processed further in order to remove outliers and faulty measuring points and to achieve a better optical presentability.

A laser line scanner 14 is arranged above at least each rail 6 to record the exact shape of the respective rail surface. With this, additional features such as rolling marks, sleeper identifications, fastening means etc. are also detected. Furthermore, several eddy current scanners 15 are arranged to record the position of metallic objects such as fastening means 8.

By means of an inertial measuring unit 16, position changes during a forward motion are detected and in this manner the exact relative track position is recorded. An absolute reference is established by means of a GNSS receiver 17. This method becomes more precise by inclusion of GNSS reference stations which are arranged, for instance, at stationary structures such as bridges.

An even more precise absolute position determination takes place by means of mast bolts 18 arranged in the permanent way 3, the positions of which with respect to the track are detected by means of a stereo camera 19, for instance. A corresponding method is disclosed in the Austrian patent application A199/2016 filed by the same applicant.

Additionally, at least one camera 20 is provided to record colour data which, in the course of data processing, are assigned to the individual points of the point cloud captured by means of the laser rotation scanner 13. Favourably, this is a high-resolution camera, so that a separate colour pixel can be assigned to every point of the point cloud. By means of several cameras 20, it is possible to collect correspondingly more colour information and assign the same to the point cloud.

The measurement data 40 recorded by means of the individual sensors or receiving devices 13, 14, 15, 16, 17, 19, 20 are fed to a common evaluation device 21. The data processed by the evaluation device 21 are fed to a control device 22 of the construction- and/or maintenance machine 4.

Figure 2:
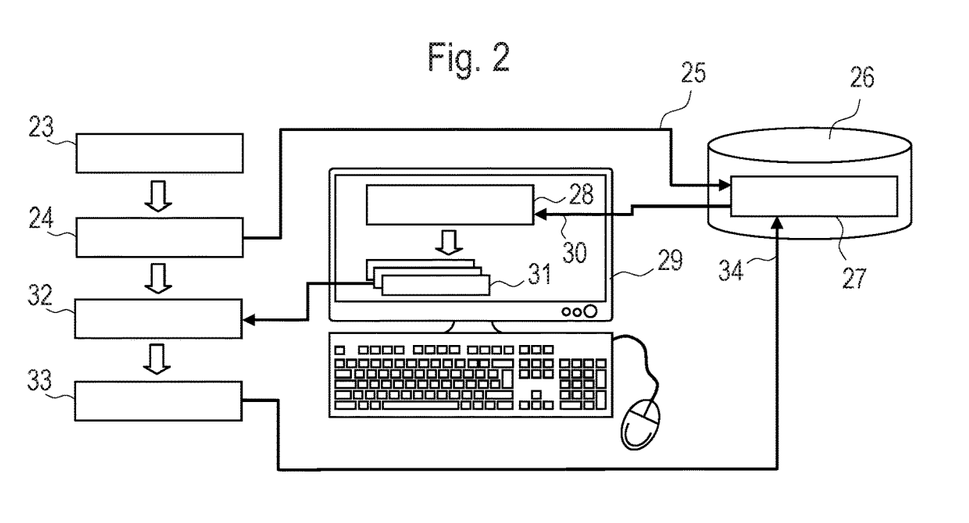

As shown in FIG. 2, the maintenance method begins with the surveying 23 of the permanent way 3. In the evaluation device 21, an analysis step 24 takes place. During this, objects 5, 6, 7, 8, 9, 10, 11 of the permanent way 3 are detected from the measurement data 40. In further sequence, detected objects 5, 6, 7, 8, 9, 10, 11 are each assigned to an object class and linked to position data, wherein each object class is defined by a unique object class identification. In addition, a multi-dimensional model 79 of the permanent way 3 is computed from the measurement data 40 and from characteristic data 80, 81 of the measuring system 2.

The linked object data 25 are transmitted to a database 26. Here, the data management and data storage 27 take place. The data of the multi-dimensional model 79 are likewise transmitted to the database 26 and managed there or fed to a separate data management. In the latter case, a superimposed data management including all data is useful.

Favourably, the data management is installed in a central server or server network with a secure connection to the internet. In this way, there is the possibility to retrieve stored measurement- and analysis data 101, 105 worldwide. The collected data form the basis for track work planning 28 which takes place by means of a computer 29. To that end, the computer 29 accesses the database 26 or a super-imposed data management plane and retrieves the route-related object- and model data 30 required for the particular planning.

By means of an automatized comparison with specified desired-condition data of the selected route, work assignment data 31 emerge. These are transmitted to the construction and/or maintenance machine 4 and are available as a target for the control process 32 of the machine 4.

For documenting the work results, check measurement and logging 33 take place in a next method step. In this, measurement data 40 are again recorded by means of the measuring system 2 and further processed to yield updated condition data 34 of the permanent way 3. These data also are stored in the database 26.

Additionally, the measurement data 40 are transferred to an electronic measurement recorder (Data Recording Prozessor, DRP) for generating acceptance reports.

For transferring the data 25, 30, 31, 34, the maintenance system 1 comprises a data transfer system 35 which is designed, for example, as a secured wireless network. A corresponding antenna 36 is arranged on the construction and/or maintenance machine 4. In the simplest case, the data to be transmitted are collectively transferred to a central data management system. The data transmission system 35 then comprises interchangeable storage mediums and corresponding writing- and reading devices.

The data transmission system 35 is connected to a computer network 37 which comprises a database server with implemented database 26. With this, a central management of the data takes place, wherein the computer 29 accesses the database 26 or the superordinated data administration plane for carrying out the track work planning 28. The work assignment data 31 generated by means of the computer 29 are likewise transmitted via the computer network 37 and the data transmission system 35 to the construction and/or maintenance machine 4.

The computer 29 and the evaluation device 21 are elements of a secured computer system 38 and are connected to the computer network 37. It is also possible to provide several computers 29 which in each case access the database 26 or the superordinate data management plane and are designed for track the work planning 28. If needed, external data sources 39 can also be accessed via the computer network 37.

If the construction and/or maintenance machine 4 is provided exclusively for an insular track network, it may be useful to integrate all components of the maintenance system in the construction and/or maintenance machine 4. The data transmission system 35 is then designed as a wire-based network within the machine 4. In this embodiment of the invention, the evaluation device 21 and the database 26 can be integrated into a high-performance on-board computer.

Figure 3:
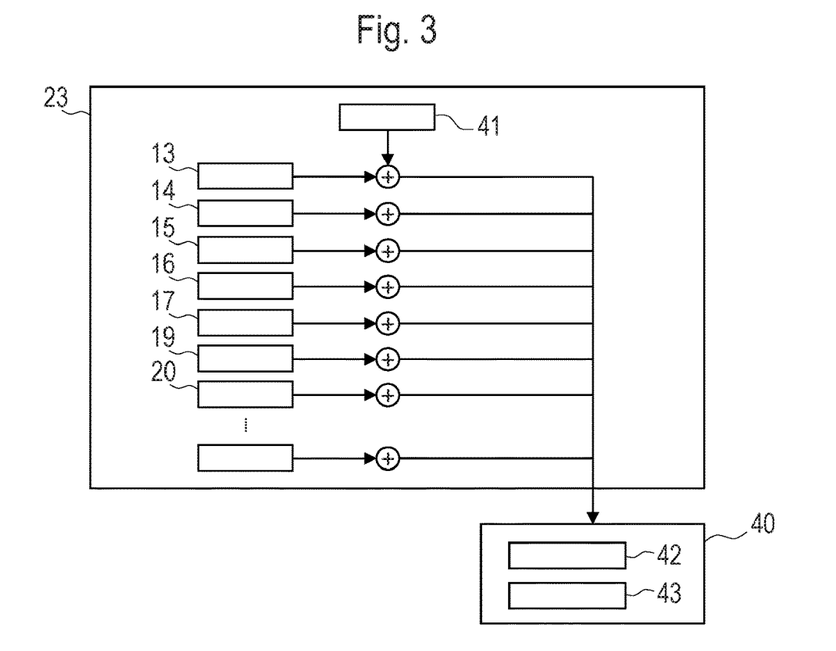

The operating mode of the measuring system 2 will be explained with reference to FIG. 3. This is a fully automatic computer-aided measuring system 2 which records measurements and parameters for the track work planning 28 with the required precision and quality.

The surveying 23 results in synchronised measurement data 40 of the permanent way 3. Specifically, the individual sensors or receiving devices 13, 14, 15, 16, 17, 19, 20 deliver respective data which are matched to one another by means of a respective synchronisation characteristic 41. These measurement data 40 are thus raw data 42 or results 43 of a sensor-internal evaluation.

In further sequence, a computer-aided model 79 of the permanent way 3 is calculated from these measurement data 40 by data fusion. In a simple embodiment, the model 79 depicts the geometrical circumstances of the permanent way 3 because these vary considerably and thus are particularly demanding on operating personnel of a construction and/or maintenance machine 4. On the basis of the geometrical model 79, a largely automated work process becomes possible.

For maintenance planning, further condition data of the permanent way 3 are also useful. For example, it is possible with additional sensors like georadar, temperature sensors, humidity sensors etc. to record also non-geometrical aspects of the permanent way 3 and to integrate them into the model 79.

The type of sensor or receiving device 13, 14, 15, 16, 17, 19, 20 used is matched to the respective case of need and adapted to the conditions reqired for the work process. If novel sensors are available, these can be included in a simple manner in the group of supported sensors. With this, the added measurement data 40 can be integrated into the model 79 and are available for further work processes.

Work processes which can be carried out by means of the maintenance system 1 are, for example, track lining, track tamping, track position measuring, quality assurance, catenary course measurement, catenary wear measurement, rail profile measurement, detection of missing fastenings, ballast profile measurement, acceptance checks, compiling of acceptance reports, recording track quality, recording damages, inventory, recording transgressions of the clearance profile, etc.

In particular, the following actual conditions of the permanent way 3 are evaluated by means of the individual sensors or receiving devices 13, 14, 15, 16, 17, 19, 20: the GNSS receiver 17, the inertial measurement unit 16 and the stereo camera 19 serve for recording the geodetic track position. A redundant design of these components can increase the availability and the precision of the measured coordinates.

The laser rotation scanner 13 serves for recording the rails or rail sections 6, the sleepers 7, the contact wire or contact wire sections 10, the masts 9, as well as tunnel walls, buildings, vegetation, signages, hangers, inscriptions and all other objects located in the detection region of the scanners 13.

During contact wire course measurement, the contact wire 10 is detected within a relevant region, and stored. Particularly, the relative distance to the track center is found. During this, the track axis is computed by means of the recorded rails 6.

The laser line scanners 14 arranged above the track serve to record details of the region close to the rails as well as the gauge axis, the track axis, the rail profile, etc. Since this type of sensor delivers data of high quality, laser line scanners 14 are also employed for precise detection of fish plates, sleeper fastenings, check rails, contact wires and any other objects.

Figure 4:
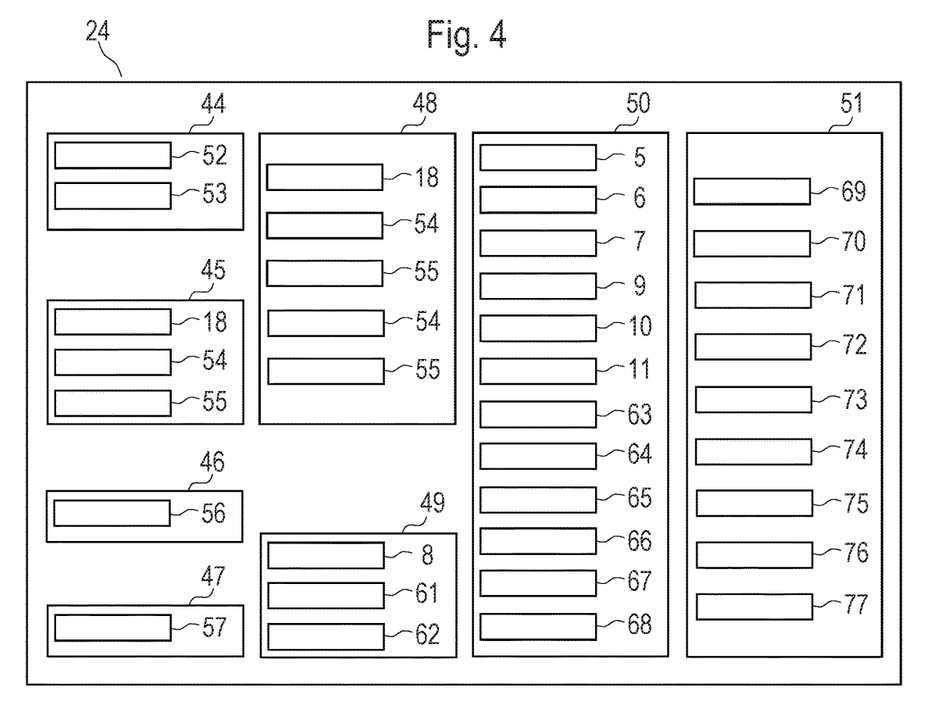

The measurement data 40 recorded by means of the measuring system 2 are automatically analysed in the evaluation device 21, as explained in more detail with reference to FIG. 4. Specifically, a software subdivided into several analysis blocks 44, 45, 46, 47, 48, 49, 50, 51 runs in the evaluation device 21. Processing takes place sequentially or parallel, depending on structure and capacity of the hardware- and software components.

In a first analysis block 44, an image analysis takes place by means of pattern recognition software and OCR software, wherein hectometre boards 52 and sign boards 53 are detected as objects. In this, image data of the forward-pointed camera 20 which are intermediately stored in a storage unit of the evaluation device 21 are evaluated.

A second analysis block 45 also works with a pattern recognition software and an evaluation software for detecting parallaxes in double images which are recorded by means of the stereo camera 19. With this, mast bolts 18 affixed to masts 9 and other fixed points 54 as well as geo-coordinates are detected.

A third analysis block 46 works with an evaluation software for received GNSS data and delivers geodetic position coordinates 56 referenced to the position of the GNSS receiver 17. These position coordinates 56 are transformed to a specified reference coordinate system by means of computer-aided coordinate transformation.

A fourth analysis block 47 evaluates the measurement data 40 recorded by means of an odometer, from which current position data 57 of a specified machine reference point emerge. Here also, a coordinate transformation to the reference coordinate system takes place.

In a fifth analysis block 48, the evaluation of the inertial measuring unit 16 takes place. This unit records relative track coordinates of a reference point during forward travel, wherein the distances of this reference point to the two rails 6 are continuously measured via distance measuring devices (laser sensors, for example). Usually, a section line between the respective rail inner side and an imaginary horizontal plane situated 14 mm below the respective rail upper edge is used in this as a rail-based measuring line. The evaluation by means of the fifth analysis block 48 thus delivers data for the track course 56 as well as a track super-elevation 57, a direction 58, longitudinal levels 59 and versines 60.

A sixth analysis block 49 evaluates the data of the respective eddy current scanner 15 and delivers position data with regard to metallic elements such as fastening means 8 (sleeper fastening), cables 61 or switch rod assemblys 62.

Figure 5:
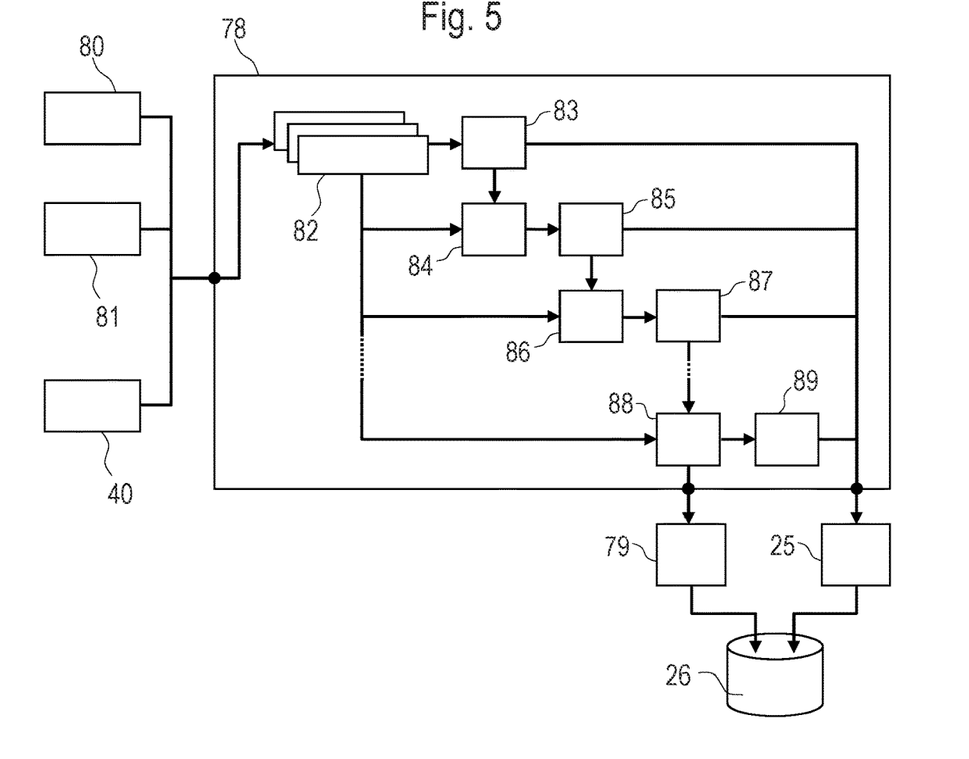

A seventh analysis block 50 uses 3D data analysis. In this, a multi-dimensional model 79 of the permanent way 3 is computed from the measurement data 40. This takes place by means of a software for sensor data fusion, as shown in FIG. 5. Additional results of the data analysis are recognised objects which can be assigned to specified object classes.

Apart from the detected objects such as rails 6, ballast 5, obstacles 11, contact wires 10, platform edges 63, masts 9, attachment parts 64, sleepers 7 or constraints 65 (bridges, track overpasses), there are also detected clearance profile transgressions 66, the track distance 67 and the ballast profile 68.

In an eighth analysis block 51, an image analysis takes place by means of a pattern recognition software and, if required, an OCR software, wherein the measurement data 40 of the downwardly-directed laser line scanners 14 are evaluated. Specifically, this takes place by means of 2.5D analysis or 3D analysis. Thus are detected a track gauge 69, rail faults 70, rail rolling marks 71, fastening defects 72, sleeper marks 73, rail profiles 74, individual stones 75 on sleepers 7, wear 76 and fish-plates 77.

Thus, with the cited analysis blocks 44, 45, 46, 47, 48, 49, 50, 51, an automatic, computer-aided analysis of the recorded measurement data 40 takes place with the objective of a classification of the parameters and values relevant for a particular work process. The classification leads to clearly defined objects with attached measuring values and data for storage in the database 26. In further sequence, these data can be used in CAD models and other operational, technical and other software systems.

By transmission of the data to a central memory, work processes are also supported which do not take place directly at the permanent way 3 (construction site planning, procurement of operational materials, exchange of operational materials, quality assurance, etc.). It is also possible to realize with this a representation in virtual reality devices for virtual visiting and presenting the permanent way 3.

Furthermore, a classification according to non-geometric criteria is carried out, if needed (temperature, density of materials, etc.) in order to make a relevant evaluation and to thus optimize work processes. For example, a higher quality of the track position can be achieved during a track tamping procedure if the density of the ballast bed is known beforehand.

For automatic track tamping or the so-called dynamic track stabilising, the advance recognition of obstacles 11 and the precise surveying of the sleepers 7 are of great importance. The described surveying 23 with subsequent analysis 24 yields in advance all data to prevent damages by the various work units 12 during a track tamping procedure. Thus is realized either a warning system for the operating personnel or fully automatic track tamping.

The structure of the analysis software 78 for computing the multi-dimensional model 79 and object data 25 is shown in FIG. 5. Input data are the measurement data 40 and characteristic data 80, 81 which concern characteristics of the measuring system 2. This can be, on the one hand, characteristic data 80 of the construction and/or maintenance machine 4 and, on the other hand, characteristic data 81 of the sensors or receiving devices 13, 14, 15, 16, 17, 19, 20.

In a first step, by means of several pre-processing modules 82, the input data 40, 80, 81 are prepared for the analysis. During this, coordinate transformations take place, for example, to synchronize all data to a common reference system.

By means of a first analysis module 83, first objects are detected from the processed data. These are, for example, approximately point-shaped objects such as fastening means 8 which can be unambiguously classified by response of the eddy current sensor 15 moving across them. On the one hand, the corresponding object data 25 are put out and, on the other hand, transmitted to a first data fusion module 84.

By means of the first data fusion module 84, the pre-processed input data 40, 80, 81 are linked to the object data 25 of the recognized objects. The result is a two-dimensional database for a second analysis module 85. With this, all objects are recognized which, on account of a two-dimensional extension, can be assigned unambiguously to a reference object class. These object data 25 received as analysis results are again put out and transferred to a second data fusion module 86.

The pre-processed input data 40, 80, 81 are fed also to this second data fusion module 86, so that a three-dimensional database for a third analysis module 87 emerges. An analysis of the three-dimensional structures yields further recognised objects, the object data 25 of which are stored.

By means of further data fusion modules 88, additional dimensions can be added to the database. These can concern the recording time or certain material characteristics (for example, density, temperature). By means of further analysis modules 89, the database can be evaluated with regard to these additional dimensions.

After the last data fusion, a virtual n-dimensional model 79 of the permanent way 3 exists, wherein n−1 indicates the number of data fusion operations. This multi-dimensional model 79 is stored in the database 26 or separately and is available for the planning and execution of maintenance measures. This also goes for the object data 25 of the individual recognized objects, which are stored in the database 26.

A further advantageous aspect of the invention relates to the control of the construction and/or maintenance machine 4. This is explained with reference to FIG. 6. Implemented in the control device 22 is a machine control software 90. Fed into the same as input data are the object data 25 and the multi-dimensional model 79, or the data of this model 79 which are relevant for a particular work sequence. In addition, a momentarily recorded machine position 91 and relevant machine characteristics 92 form input data of the machine control software 90.

Figure 6:
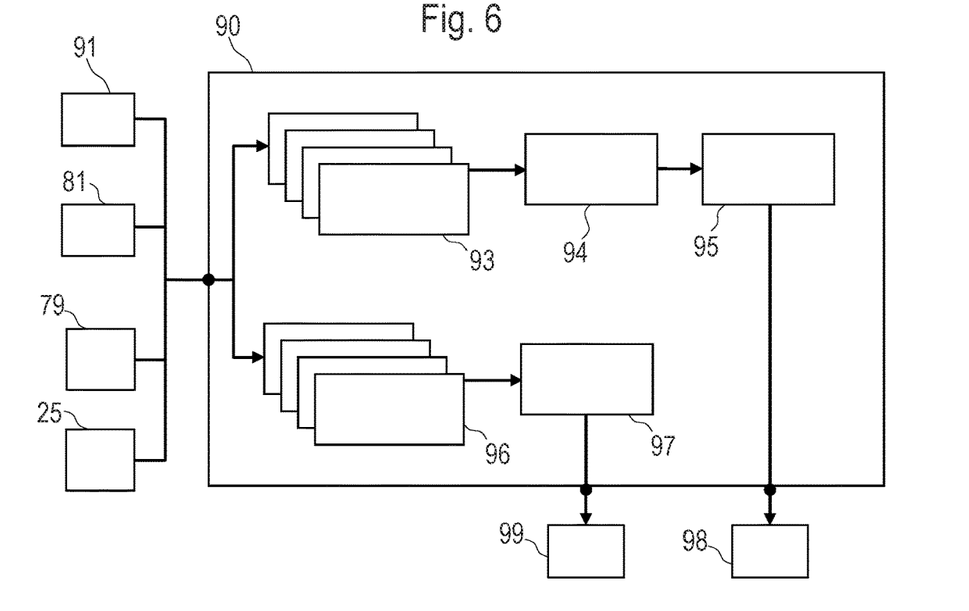

Advantageously, the recording of the momentary machine position 91 takes place by means of the measuring system 2 which was used in the preliminary stage already for recording the permanent way 3. Relevant machine characteristics 92 are, for example, distinctive machine dimensions, particularly distance measures between elements of the measuring system 2 and various working units 12.

Depending on which construction and/or maintenance machine 4 is involved, different working units 12 are employed. Machine types in question are, for example, a renewal train, a sweeping machine, a ballast plough, a measuring car, a track tamping machine or a switch tamping machine.

In the case of a switch tamping machine, several working units 12 have to be controlled. A lifting- and lining unit comprises roller tongs and hooks which can be controlled individually. The respective roller tong is guided along a rail 6 and must be opened at obstacles 11. In tight space conditions, the respective hook is employed. Since every obstacle 11 is recognized as an object by means of the described analysis method, and since the position of said object in the track is fed to the control device 22, an automatized operation of the lifting- and lining unit is possible.

The same goes for the tamping units. Each tamping unit is positioned correctly above the track over the respective sleeper crib. In the case of rotated sleepers, a rotation of the tamping units takes place. In addition, the work angles of tamping tines are adjusted according to the free space in the sleeper crib. Individual tamping tines can be deactivated by being tilted upward.

By means of the multi-dimensional model 79, each parameter (angle of rotation, position of the parts, inclination of the tamping tines, etc.) of the particular working unit 12 is computed beforehand and displayed to operation personnel as a working suggestion. This display takes place computer-aided in a realistic manner. Augmented reality and virtual reality devices (for example Oculus Rift, Microsoft Hololens, HTC vive etc.) may be used in order to ensure high operator convenience and work place ergonomics.

In particular, a unit action is computed via the input data 25, 79, 81, 91 for each controlled working unit 12 by means of a respective action module 93. Results of these computations are, for example, a rail lifting value for a lifting- and lining unit and position values for a tamping unit.

These action data are fed to a coordination module 94 in order to coordinate the individual unit actions with one another and to generate control orders. These control orders are processed in a following transfer module 95 for a storage programmable control (SPS) of the construction and/or maintenance machine 4 and passed on to the same.

Parallel thereto, various setting parameters are computed for the individual working units 12 by means of parameter modules 96, for example the squeezing duration of a tamping unit. In a following transfer module 97, a parameter data processing and—transfer to the SPS of the construction-and/or maintenance maintenance 4 takes place.

The processed action- and parameter data are control data by means of which the construction- and/or maintenance machine 4 carries out an automatized motion sequence 98 of the controlled working units 12, wherein a regulating 99 of the specified parameters takes place.

In a simple embodiment, purely geometric basic conditions are recorded and analysed in order to automatize the adaptation of the construction- and/or maintenance maintenance 4 and the working units 12 thereof to structural circumstances. A method leading further stipulates that also non-geometric data enter into the control specifications, for example the density of the subgrade or the moisture level thereof. By means of such parameters, the squeezing duration of a tamping unit or the travel speed can be optimized.

Figure 7:
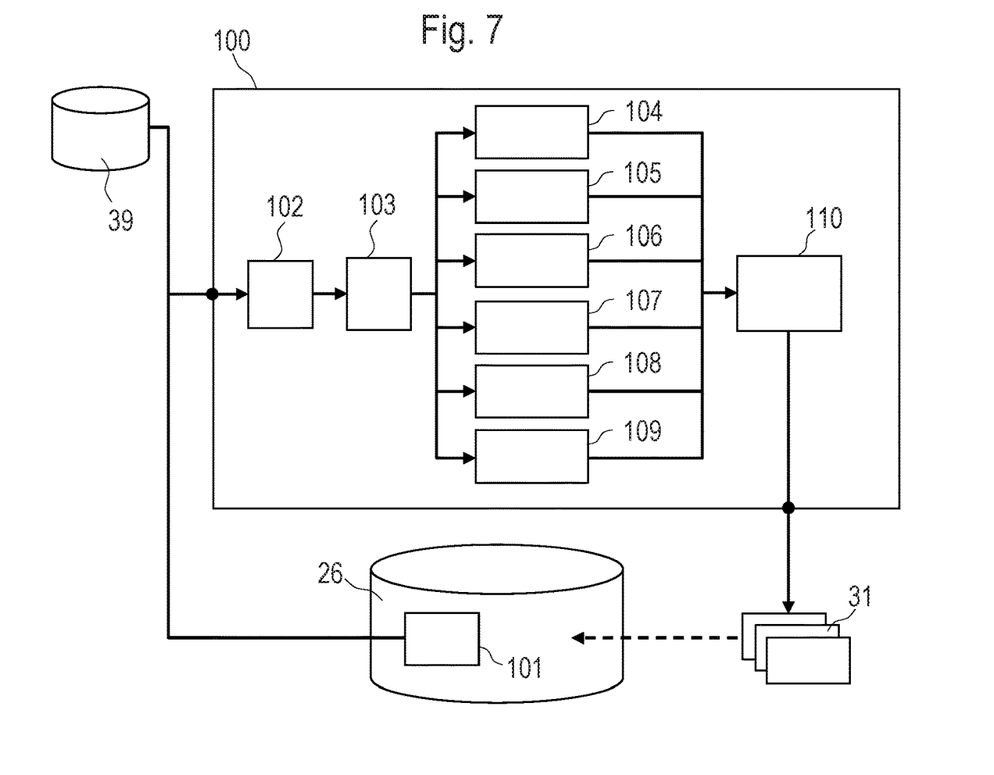

In an advanced embodiment of the invention, a fully integrated track maintenance software 100 is used (FIG. 7). Individual modules of this software 100 can be implemented on different computers of the computer system 38. Input data are relevant measuring- and analysis data 101, stored in the database 26 or administered by the superordinated data management plane, and data from external data sources 39. The relevant measuring- and analysis data 101 are composed, for instance, of selected object data 25, 30 and data of the model 79.

The track maintenance software 100 is intended for execution of several method steps. First, a data fusion 102 takes place with a following data display 103. Said data display 103 advantageously takes place by means of virtual reality output device.

In method steps designed to be carried out in parallel, an integrated route planning 104, integrated order generating 105, integrated ordering 106 of objects of the permanent way 3 to be exchanged, a data transmission 107 to a management software (Enterprise-Resource-Planning, ERP), an integrated measuring operation planning 108 and an integrated maintenance- and renewal planning 109 take place, for example.

The results of these method steps are used for automatized order generating 110 in order to supply work order data 31 for the construction- and/or maintenance machine 4. These work order data 31 are transmitted via the data transmission system 35 directly to the construction- and/or maintenance machine 4 and/or stored in the database 26.

Figure 8:
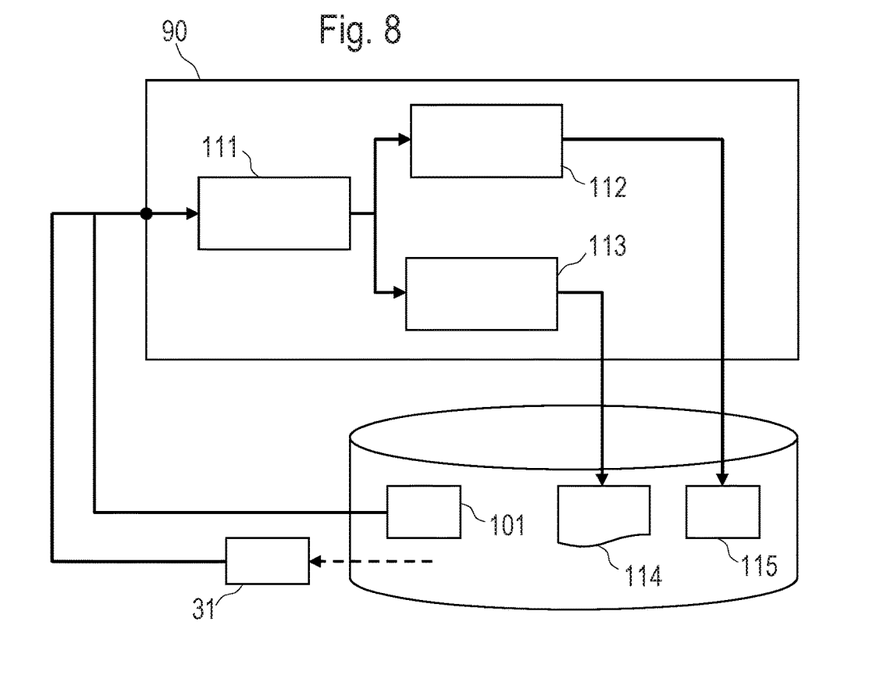

FIG. 8 shows a work sequence of the construction- and/or maintenance machine 4 by means of machine control software 90. Input data are the stored relevant measuring- and analysis data 101 and the respective work order data 31. From these, the machine control software 90 computes all required action data and parameter data for carrying out a fully automatic control operation 111 of the the construction- and/or maintenance machine 4.

Following that, a fully automatic check measuring operation 112 takes place with using the measuring system 2. Parallel thereto, a logging operation 113 for complete logging of all unit actions runs in the control device 22.

As results of these operations 111, 112, 113, a work protocol 114 and updated measuring- and analysis data 115 are put out. These are stored in the database 26 and are available for further maintenance measures.

Thus, measuring orders and maintenance orders of fully automatic construction- and/or maintenance machines 4 are carried out after being allocated, and a protocol of the completion as well as measuring data recorded prior to and after a treatment are stored centrally. As for orders which cannot be carried out with automatized machines, a separate automatized measuring run takes place after completion, with storage of the measurement data 40 in the database 26.

The invention claimed is:

1. A method for maintenance of a permanent way for rail vehicles, the method comprising the following steps:
using a measuring system to record measurement data for determining an actual condition of the permanent way;
using an evaluation device to detect objects along the permanent way from the measurement data;
assigning a detected object to an object class;
storing an object class identification linked to positional data for an assigned object in a database;
deriving control data for a work sequence of at least one of a rail-bound construction machine or a rail-bound maintenance machine from the data stored in the database; and
specifying a target condition of the permanent way, evaluating deviations of the actual condition from the target condition, and prescribing the control data in dependence on the evaluated deviations.

2. The method according to claim 1, which further comprises carrying out the step of detecting the objects by comparing the measurement data with preset object parameters.

3. The method according to claim 1, which further comprises storing a unique object identification for a respective object in the database.

4. The method according to claim 1, which further comprises deriving location-related synchronisation data from the measurement data, and storing associated synchronisation data in the database for a respective object.

5. The method according to claim 1, which further comprises computing a mufti-dimensional model of the permanent way from the measurement data and from characteristic data of the measuring system.

6. The method according to claim 5, which further comprises supplementing the multi-dimensional model with data of a virtual clearance gauge.

7. The method according to claim 5, which further comprises supplementing the multi-dimensional model with geo-referenced information data of a separate data source.

8. The method according to claim 1, which further comprises determining the actual condition of the permanent way after a work sequence of the at least one of the rail-bound construction machine or rail-bound maintenance machine.

9. A maintenance system for a permanent way for rail vehicles, the maintenance system comprising:
a measuring system installed on a rail vehicle for recording measurement data;
an evaluation device configured for detecting objects along the permanent way from the measurement data and for assigning a respective object to an object class;
a database;
a data transmission system configured for transmitting the data assigned to the object to said database; and
at least one of a rail-bound construction machine or a rail-bound maintenance machine configured for processing control data derived from data stored in said database.

10. The maintenance system according to claim 9, wherein said evaluation device is configured for computing a multi-dimensional model of the permanent way from the measurement data and from characteristic data of said measuring system.

11. The maintenance system according to claim 10, which further comprises an output device of the maintenance system for perspective representation of the multi-dimensional model.

12. The maintenance system according to claim 9, wherein said measuring system Includes a laser rotation scanner, a laser line scanner, an eddy current scanner, an inertial measuring unit, a camera and a GNSS receiver.

* * * * *